Sept. 14, 1954   J. C. VANDEN BERG   2,688,777
ROTARY SEPARATOR AND PICKER
Filed Nov. 4, 1950
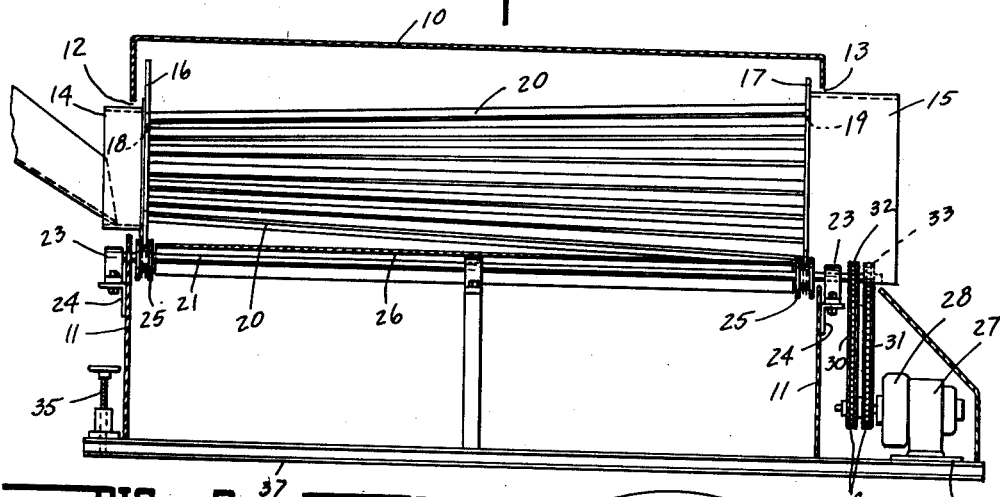
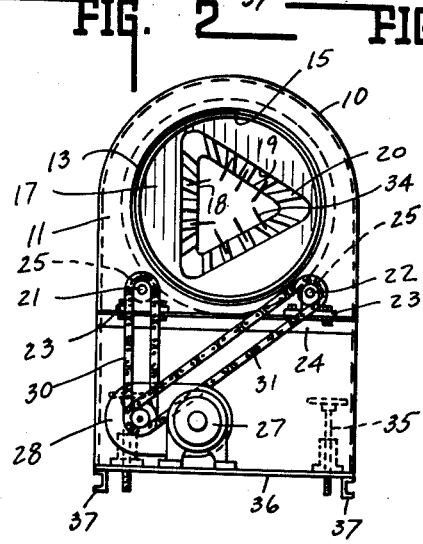
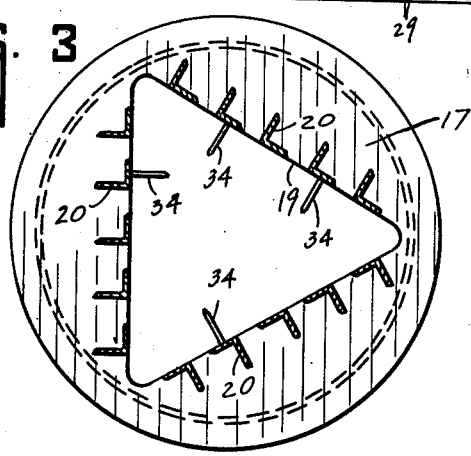
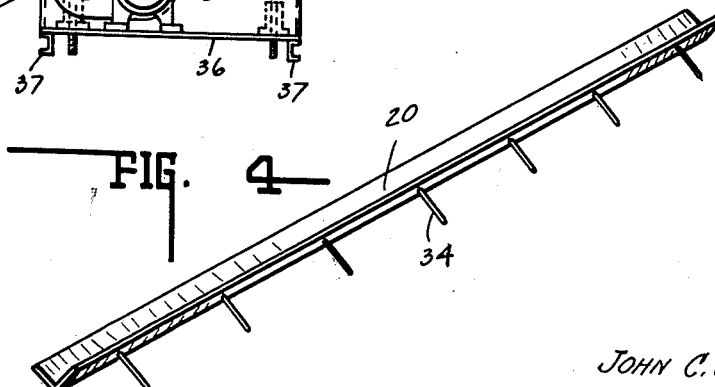
INVENTOR.
JOHN C. VANDEN BERG
BY
Lockwood, Hahn, Galt & Woodard.
ATTORNEYS.

Patented Sept. 14, 1954

2,688,777

UNITED STATES PATENT OFFICE 2,688,777
ROTARY SEPARATOR AND PICKER

John C. Vanden Berg, Fort Wayne, Ind., assignor to Waste Conditioning, Inc., Indianapolis, Ind., a corporation Application November 4, 1950, Serial No. 194,139

3 Claims. (Cl. 19—90)

This invention relates to a rotary separator and picker for waste packing.

Waste packing is utilized in journal boxes of most railroad cars. After predetermined use it is removed and replaced with reconditioned waste or with new waste that has been oil treated for lubrication. Waste deteriorates in use incident to heat, dirt inclusion, etc. The major portion thereof, however, can be reclaimed by deoiling, loosening and cleaning by separating therefrom the dirt, bearing wear particles, lint and short ends as well as charred portions. After such treatment within the device of this invention it is pressure renovated by washing with hot oil. This oil is extracted and the cleaned loosened waste can be treated again in the present invention. The waste is then ready for use. New waste before use in the journal boxes can also be treated in this invention.

The chief object of this invention is to slowly rotate a slat-like cage arranged to pass waste therethrough from end to end while disposing it so that the entrapped dirt, foreign particles, lint and short ends will separate out from the advancing mass of waste.

The chief feature of the invention resides in slowly rotating such a cage preferably of frusto-polygonal type, the larger end being coincident with the discharge end, and disposing in such cage picker pins or fingers to separate the mass into loose fibres.

Other objects and features of the invention will be set forth more fully hereinafter.

The full nature of the invention will be understood from the accompanying drawings and the following description and claims.

In the drawings,

Fig. 1 is a side elevation, the housing being shown in section.

Fig. 2 is an end elevation view of the invention with the motor guard plate removed.

Fig. 3 is a transverse section of the separator in the plane of one set of pins.

Fig. 4 is a perspective view of an angle bar type of slat.

A hood-like housing 10 is shown in Figs. 1 and 2 of the drawings, the ends 11 thereof being apertured at 12 and 13 to form an inlet end and an outlet or discharge end respectively. Extending through said ends are cylindrical sleeves 14 and 15 which are respectively connected at their inner edges to circular plates 16 and 17. The plates have identically sized peripheries but different sized centrally disposed openings 18 and 19. The inlet opening 18 is smaller than the outlet opening as shown in Fig. 1. Both openings are polygonal in outline, they being represented in the drawings as triangles. These openings have a common axis. Bars 20, preferably in the form of angles for reinforcement purposes, extend from one of said plates to the other and at the opposite ends are secured to said plates at the marginal edges thereof that define said polygonal openings. By reason of the difference in the size of the openings the bars will be disposed in diverging relation one to the other from the inlet opening to the outlet opening. The cage thus formed by the bars will be of frusto-polygonal outline and shape and will be tapered. To state it another way, the bars will be flared outwardly from the inlet opening to the outlet opening. With this construction the waste supplied through the inlet opening will be fed progressively through the cage in a generally downward direction to the outlet opening. This arrangement not only causes the waste to be gravity fed from the inlet to the outlet opening but as well, by reason of the diverging of the bars will provide progressively greater space between adjacent bars to facilitate the dropping therethrough of the entrapped dirt, foreign particles, lint and short ends which will be "separated out" from the advancing mass of waste.

Power for rotating the aforesaid cage comprises a pair of parallel shafts 21 and 22 suitably supported in pillow blocks 23 carried by cross members 24. Co-planar with circular plates 16 and 17 and on shafts 21 and 22 are the sheave wheels 25. Shields 26 are disposed over the shafts and between the said wheels.

These shafts when rotated in one direction rotate the plates and hence the cage. Herein, by way of example only, a suitable power drive for the shafts comprises a motor 27, a speed reducer 28, a pair of sprocket wheels 29 at the output end thereof, sprocket chains 30 and 31 and sprocket wheels 32 and 33 upon the exposed ends of shafts 21 and 22 respectively. Any other suitable low speed power drive may be utilized.

A separator with end plates about three to four feet in diameter and from eight to fifteen feet long is rotated at a speed of from fifteen to twenty-five R. P. M.

Herein, see Figs 2, 3 and 4, certain of said angle slats carry a longitudinal series of inwardly directed or transversely disposed picker pins 34. These may be about three inches long and may be spaced apart about three inches. The pin carrying slats of which there are at least two per side are disposed about half side width distance apart and equidistant from the ends of said side. Note the holes in plates 16 and 17 do not have vertices but have arcuate outlines. Also note all dimensions specified hereinbefore as well as what follows are representative only. The bars may be 1½ to 2" wide by a quarter inch and spaced from ¾ to 1½" or so apart at the larger end. There is of course less actual spacing at the smaller end of the cage.

The waste supplied at the inlet is tumbled as it were.

In order to vary the speed of feed through the cage the inlet end of the cage may be elevated to the desired angle through the medium of the screw jacks 35 which are secured on the rear cross bars 36 extending between the longitudinal channel bars 37 forming a supporting base for the structure. By raising the intake end the angle of inclination of the cage may be adjusted to adjust the gravity feed of the material through the cage.

While the invention has been illustrated and described in great detail in the drawings and foregoing description, the same is to be considered as illustrative and not restrictive in character.

The invention claimed is:

1. In a rotary separator and picker for waste packing, a frusto-polygonal cage comprising a pair of spaced circular plates having polygonal openings defining an inlet and an outlet respectively, said inlet opening being smaller than said outlet opening but having a common axis, and a plurality of bars including spaced inwardly projecting pins, said bars extending longitudinally between said plates and connected thereto adjacent said respective openings, whereby said bars are progressively spaced apart from said inlet to said outlet, and power means rotating said plates.

2. In a rotary separator and picker for waste packing, a triangularly shaped cage comprising a pair of spaced circular plates having triangular openings defining an inlet and an outlet respectively, the inlet being smaller than the outlet and a plurality of bars including spaced inwardly projecting pins, said bars extending between said plates and connected to the confronting faces thereof adjacent said openings, whereby said bars are inclined and progressively spaced apart from said inlet to said outlet, and power means rotating said plates.

3. In a rotary separator and picker for waste packing, a triangularly shaped cage comprising a pair of spaced circular plates having triangular openings defining an inlet and an outlet respectively, said inlet being smaller than said outlet but having a common axis, and a plurality of bars extending longitudinally between said plates and connected to the confronting faces thereof adjacent said openings, whereby said bars are progressively spaced apart from said inlet to said outlet to form a tapered cage, inwardly projecting and longitudinally spaced pins carried by certain of said bars, and power means rotating said plates.

References Cited in the file of this patent

UNITED STATES PATENTS

| Number | Name | Date |
|---|---|---|
| 670,643 | Sargent | Mar. 26, 1901 |
| 1,445,849 | Sargent | Feb. 20, 1923 |
| 1,743,240 | Ryder | June 14, 1930 |
| 2,055,943 | Pearce | Sept. 29, 1936 |
| 2,076,420 | Windle | Apr. 6, 1937 |
| 2,161,032 | Formay | June 6, 1939 |
| 2,348,597 | Booth | May 9, 1944 |